United States Patent Office 3,213,872
Patented Oct. 26, 1965

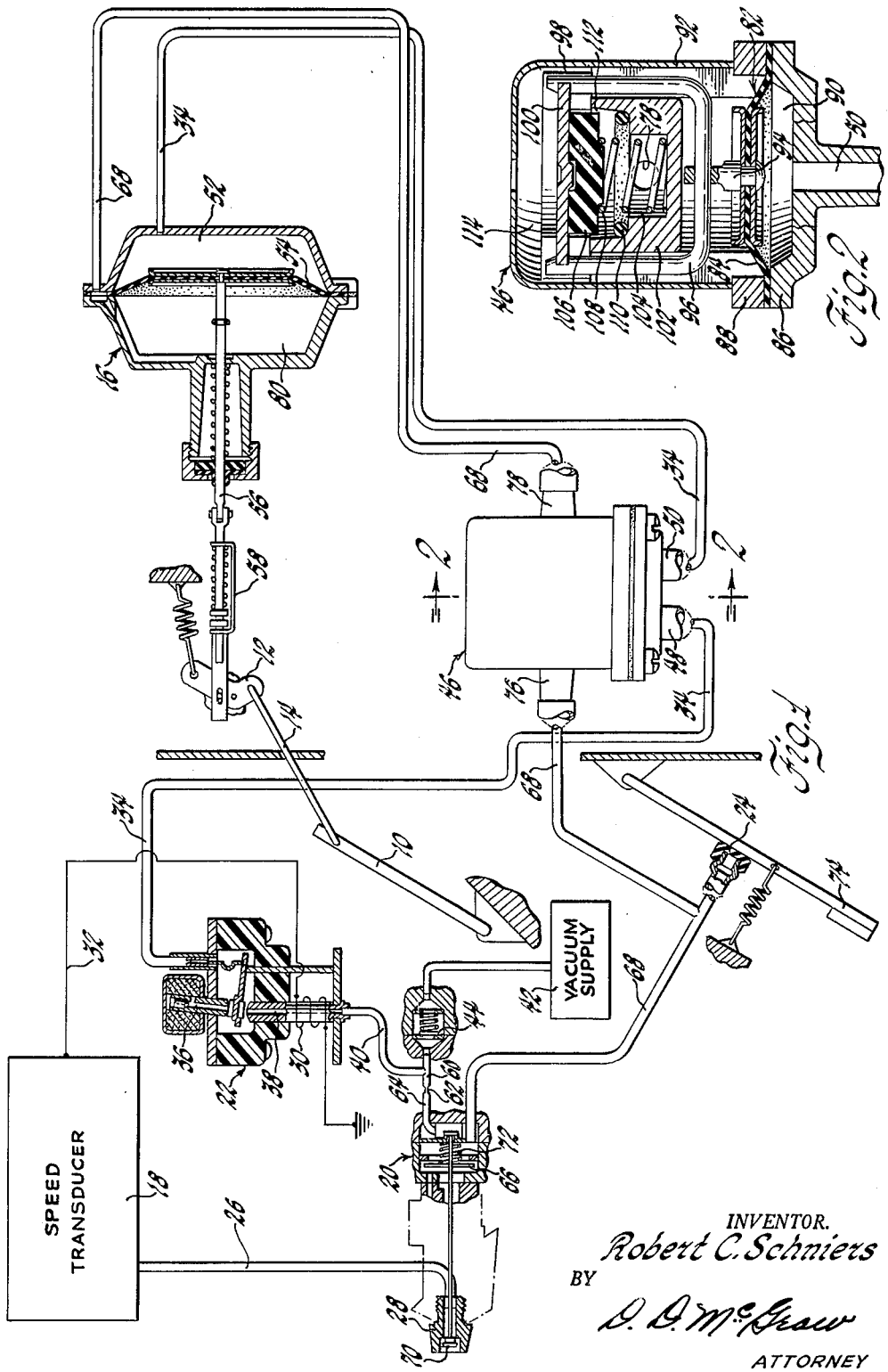

3,213,872
INHIBITING VALVE FOR ELECTRO-PNEUMATIC CRUISE CONTROL
Robert C. Schniers, Flint, Mich., assignor to General Motors Corporation, Detroit, Mich., a corporation of Delaware
Filed Aug. 21, 1961, Ser. No. 132,977
4 Claims. (Cl. 137—47)

The invention relates to a dual pressure control valve, particularly for use in a vehicle road speed control system having a speed warning control pressure and a speed controlling control pressure. It has been found desirable to permit the operation of a vehicle speed control system in the speed warning mode while preventing the vehicle operator from engaging this system in the speed control mode until the vehicle speed, manually controlled by the accelerator, reaches the set speed at which the speed control system is to automatically control the vehicle. A system of the type in which the valve is especially adapted to be used is disclosed and claimed in United States patent application Serial No. 67,820, entitled Vehicle Speed Warning and Cruise Control System, filed November 7, 1960, now Patent No. 3,088,538, granted May 7, 1963, and assigned to the assignee of this application. Reference is hereby made to that application for a detailed disclosure of such a system. The system illustrated in the drawings therein will therefore be only generally described.

In order to accomplish the desired system operation the inhibiting valve which is the subject of this invention operates to seal the control speed line intermediate the speed set valve in the control head and the speed control chamber of the throttle power servo only when the preset vehicle speed is attained, and to vent this line when the preset speed is not reached. Once the valve is locked in at the control speed, it will remain locked in position even if the vehicle decreases speed until the brake pedal is actuated to render the entire control system inoperative, or until the vacuum supply, or other pressure supply, approaches atmospheric pressure.

In the drawings:

FIGURE 1 is a schematic presentation of a system utilizing an inhibiting valve assembly embodying the invention, with parts broken away and in section; and FIGURE 2 is an enlarged sectional view of the inhibiting valve assembly embodying the invention and having parts broken away and in section.

The speed control system illustrated in the drawing includes the usual accelerator pedal 10 controlling a throttle valve control arm 12 connected to the engine throttle valve, appropriate intermediate throttle linkage 14, a throttle servo assembly 16 for controlling movement of the throttle in the cruise control mode of operation and for exerting a back pressure on the accelerator pedal in the speed warning mode of operation, a speed transducer 18, a control head 20, a proportional control valve 22, a brake pedal actuated spoiler valve 24, and appropriate electrical and fluid connections.

The speed transducer 18 received the vehicle actual speed signal and compares it to a set speed introduced through the mechanical link 26 which is controlled by a speed set knob 28. The resulting speed error signal is sent to the solenoid 30 of the proportional control valve assembly 22 through the electrical circuit 32 and a proportional control pressure is provided in the speed warning line 34. This pressure is generated by action of the valve assembly 22 in controlling the atmospheric pressure inlet 36 and the vacuum inlet 38 of valve assembly 22 in accordance with the speed error signal. Vacuum line 40 is connected to the vacuum supply source 42, which may be the intake manifold of the vehicle engine, through the check valve 44. The speed warning line 34 is connected to the inhibiting valve assembly 46 through the vacuum inlet 48 and continues from assembly 46 through the vacuum outlet 50 to the speed warning chamber 52 of the servo assembly 16. The speed warning pressure is therefore impressed on the diaphragm 54 of servo assembly 16 and this diaphragm is attached through the power rod 56 and the override linkage 58 of the throttle valve control arm 12. A T 60 connected with vacuum line 40 leads through a restriction 62 to the control head 20 through the line 64. The control head has a valve 66 which is to close line 64 from atmosphere, and to therefore vent the speed controlling pressure line 68, which connects with control head 20, to atmosphere, when the system is in the speed warning mode.

Movement of the cruise engage button 70 in the control head will close valve 66 against its seat and the differential air pressure on the valve will hold the valve on its seat against the force of the valve opening spring 72. The vacuum in line 64 is then introduced into the speed controlling pressure line 68. The brake pedal actuated spoiler valve 24 operates to open line 68 to atmospheric pressure when the vehicle brake pedal 74 is depressed, thereby immediately rendering the speed control mode inoperative. At all other times the valve 24 is closed. Line 68 connects with vacuum inlet 76 of the inhibiting valve assembly 46 and the vacuum outlet 78 of that valve assembly is connected to a continuation of line 68 which leads to the speed control chamber 80 of servo assembly 16. Chamber 80 is on the opposite side of diaphragm 54 from chamber 52 and is open to atmospheric pressure in the speed warning mode of operation. In the speed control mode of operation, pressure in this chamber cooperates with the opposing pressure in chamber 52 under control of the proportional control valve 22 and the speed transducer 18 to control the speed of the vehicle. This operation is more completely disclosed in the above-noted application.

Referring now to FIGURE 2, the inhibiting valve assembly 46 is shown in detail. The assembly includes a servo 82 having a diaphragm 84 received intermediate housing sections 86 and 88 to provide servo chamber 90 to which the vacuum inlet 48 and vacuum outlet 50 are connected. A suitable assembly cover 92 is provided to protect the valve assembly. Inside the cover the diaphragm 84 has a pin 94 attached to a slidably movable bail 96 in the bail guide 98, which is part of the casting of housing 88. The opposed ends of the bail 96 retain a piston valve holding strap 100. A piston valve housing 102, which is part of housing 88, is received within bail 96 and is provided with a chamber 104 to which the vacuum inlet 76 and vacuum outlet 78 are connected. Piston valve 106 is reciprocably received in one end of chamber 104 and is urged against strap 100 by the spring 108. An O-ring seal 110 is received in chamber 104 so that the lower surface of piston valve 106 may engage the seal when spring 108 is depressed and seal the chamber from the vent 112. Vent 112 opens to atmospheric chamber 114.

During normal operation of the system the speed warning circuit becomes operative when the vehicle speed reaches the set speed so that the proportional control valve 22 generates a pressure signal in line 34 in response to the speed transducer output to move diaphragm 54 to the right and exert a force on the throttle linkage tending to close the throttle, thereby putting a back pressure on the accelerator pedal which is felt by the operator. The vacuum signal in line 34 passes through chamber 90 of the inhibiting valve assembly 46, pulling diaphragm 84 downwardly and carrying pin 94, bail 96, strap 100, and piston 106 with it. As the piston seats on seal 110 the speed control line 68 is sealed from connection with atmospheric vent 112. This operatively connects speed control vacuum inlet 76 and speed control vacuum outlet 78. Assuming the cruise engage valve 66 and spoiler valve 24 to be closed, vacuum is then applied to speed control chamber 80 and the system operates in the cruise control mode. Should the speed warning vacuum in line 34 approach atmospheric pressure for some reason the diaphragm 84 would move outwardly, moving the strap 100 with it, but piston 106 would remain against seal 110, thus keeping the speed control system locked in.

It has been found to be convenient to match the effective area of piston 106 exposed to speed control vacuum and the force of spring 108 so that the spring will overcome the force of the vacuum on the piston should the speed control vacuum approach within 4½ inches of mercury of atmospheric pressure, venting the speed control vacuum line to atmosphere. Since chamber 104 is connected to atmospheric vent 112, inlet 76 and outlet 78 are each vented to atmosphere and therefore are operatively disconnected. This will render the cruise control system inoperative and the vehicle would again have to be manually brought back to the set speed and the cruise engage valve re-engaged in order to lock the system in the cruise control mode.

The check valve 44 will normally be held open by the vacuum from the vacuum supply source 42. If, however, for some reason, such as sudden movement of the engine throttle to the wide open throttle position, should the vacuum from source 42 approach atmosphere, the check valve will close and maintain a vacuum in the speed warning line 34 and the speed control line 68 for a sufficient period of time to allow the vacuum supply to again supply sufficient vacuum under normal circumstances.

What is claimed is:

1. For use in a speed warning pressure and speed control pressure vehicle road speed control system, a speed control inhibiting valve assembly comprising, a housing, a speed warning pressure inlet and a speed warning pressure outlet, a speed control pressure inlet and a speed control pressure outlet, a valve, means responsive to and connected with the speed warning pressure by said speed warning pressure inlet for moving said valve to operatively interconnect said speed control pressure inlet and outlet at a predetermined value of the speed warning pressure for rendering the vehicle road speed control system operative to control vehicle speed, and means independent of said speed warning pressure responsive means and responsive to a predetermined value of the speed control pressure connected through said speed control pressure inlet and acting on said valve to move said valve to operatively disconnect said speed control pressure inlet and outlet for rendering the vehicle road speed control system inoperative to control vehicle speed and to hold said valve in the disconnected position until said speed warning pressure responsive means is again actuated.

2. In a dual pressure control valve having a housing, provided with first and second pressure inlets and outlets, means responsive to a first pressure connected therewith by said first pressure inlet to close said valve and operatively interconnect said second pressure inlet and outlet at a predetermined value of the first pressure, said valve being held in the closed position by the second pressure, and means to open said valve at a predetermined value of the second pressure independently of said first pressure responsive means to operatively disconnect said second pressure inlet and outlet.

3. A valve assembly responsive to a first pressure and controlling the application of a second pressure, said assembly comprising, a servo connected with and responsive to the first pressure, a housing having a chamber formed therein and a piston valve received in said chamber and an inlet and an outlet connecting the second pressure with said chamber and a vent for said chamber, piston valve holding means secured to and movable by said servo, said piston valve having a first position for venting said chamber inlet and outlet and a second position for disconnecting said vent from said chamber inlet and outlet and movable by said valve holding means from said first position to said second position at a predetermined value of the first pressure and held in said second position by the second pressure and releasable to said first position at a predetermined value of the second pressure, and means for returning said piston valve to said first position from said second position independently of the first pressure and said servo.

4. A valve assembly for use in a vacuum powered speed control system having a speed warning control circuit and a speed controlling control circuit to establish a connection in the speed controlling control circuit in response to a vacuum condition in the speed warning control circuit and to disestablish the connection in the speed controlling control circuit in response to a vacuum condition in the speed controlling control circuit, said valve assembly comprising, a housing having a chamber formed therein and inlet and outlet passage means for placing said chamber in the speed controlling control circuit, valve means for sealing said chamber and for venting said chamber to atmosphere, a power servo in said housing for actuation by vacuum in the speed warning control circuit at a predetermined vacuum condition therein and having means for moving said sealing and venting valve means to the chamber sealing condition from the chamber venting condition, vacuum in said speed controlling control circuit then holding said sealing and venting valve means in the chamber sealing condition until a predetermined vacuum condition in the speed controlling control circuit releases said sealing and venting valve means, and means returning said sealing and venting valve means to said chamber venting condition upon release thereof.

References Cited by the Examiner
UNITED STATES PATENTS

| | | | |
|---|---|---|---|
| 1,488,649 | 4/24 | Scheurich | 137—505.14 |
| 2,299,884 | 10/42 | Edwards | 137—85 |
| 2,858,840 | 11/58 | Wright | 137—82 |

ISADOR WEIL, *Primary Examiner.*